United States Patent
Douglas et al.

(10) Patent No.: US 10,621,431 B2
(45) Date of Patent: Apr. 14, 2020

(54) CAMERA THAT USES LIGHT FROM PLURAL LIGHT SOURCES DISPOSED ON A DEVICE

(71) Applicant: Lenovo (Singapore) Pte. Ltd., New Tech Park (SG)

(72) Inventors: David W. Douglas, Cary, NC (US); Joseph David Plunkett, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 513 days.

(21) Appl. No.: 14/670,753

(22) Filed: Mar. 27, 2015

(65) Prior Publication Data
US 2016/0283790 A1   Sep. 29, 2016

(51) Int. Cl.
*G06K 9/00*    (2006.01)
*H04N 5/225*   (2006.01)
*G06K 9/62*    (2006.01)
*G06K 9/32*    (2006.01)

(52) U.S. Cl.
CPC ..... *G06K 9/00604* (2013.01); *G06K 9/00617* (2013.01); *G06K 9/6202* (2013.01); *H04N 5/2256* (2013.01); *G06K 2009/3291* (2013.01)

(58) Field of Classification Search
CPC ........... G06K 9/00604; G06K 9/00617; G06K 9/00597; H04N 5/2256
USPC ................................................... 348/77–78
See application file for complete search history.

(56) References Cited

U.S. PATENT DOCUMENTS

| | | |
|---|---|---|
| 2,510,344 A | 6/1950 | Law |
| 2,567,654 A | 9/1951 | Siezen |
| 3,418,426 A | 12/1968 | Schlegel et al. |
| 3,628,854 A | 12/1971 | Jampolsky |
| 4,082,433 A | 4/1978 | Appeldorn et al. |
| 4,190,330 A | 2/1980 | Berreman |
| 4,577,928 A | 3/1986 | Brown |
| 5,579,037 A | 11/1996 | Tahara et al. |
| 5,583,702 A | 12/1996 | Cintra |

(Continued)

FOREIGN PATENT DOCUMENTS

| | | |
|---|---|---|
| DE | 10310794 | 9/2004 |
| DE | 69937592 | 10/2008 |

(Continued)

OTHER PUBLICATIONS

R. Dowell, "Pre-boot biometric authentication using fingerprints", International IC—Taipei, Conference Proceedings, May 3, 2000.*

(Continued)

*Primary Examiner* — Richard A Hansell, Jr.
(74) *Attorney, Agent, or Firm* — John M. Rogitz; John L. Rogitz (57) ABSTRACT

In one aspect, a device includes a processor, a first light source accessible to the processor, a second light source different from the first light source that is accessible to the processor, a camera accessible to the processor, and storage accessible to the processor. The storage bears instructions executable by the processor to actuate the first light source to execute a first function using the camera and actuate the second light source to execute a second function different from the first function using the camera.

24 Claims, 5 Drawing Sheets

(56) References Cited

U.S. PATENT DOCUMENTS

| | | | |
|---|---|---|---|
| 6,046,847 A | | 4/2000 | Takahashi |
| 6,487,656 B1* | | 11/2002 | Kim .................... G06F 9/4403 |
| | | | 713/2 |
| 7,986,816 B1* | | 7/2011 | Hoanca .............. G06K 9/00892 |
| | | | 382/115 |
| 8,799,900 B1* | | 8/2014 | Kodorkin .............. H04N 5/262 |
| | | | 718/1 |
| 8,887,259 B1* | | 11/2014 | Harding .............. G06F 21/6254 |
| | | | 713/185 |
| 9,971,712 B2* | | 5/2018 | Oh ...................... G06F 1/1641 |
| 2004/0160419 A1 | | 8/2004 | Padgitt |
| 2006/0238707 A1* | | 10/2006 | Elvesjo .................. A61B 3/113 |
| | | | 351/209 |
| 2007/0088941 A1* | | 4/2007 | Henning .............. G06F 9/4411 |
| | | | 713/1 |
| 2008/0002863 A1* | | 1/2008 | Northcott ........... G06K 9/00604 |
| | | | 382/117 |
| 2008/0186475 A1* | | 8/2008 | Kawata ................ G01B 11/026 |
| | | | 356/73 |
| 2008/0256351 A1* | | 10/2008 | Natarajan ........... G06F 11/2284 |
| | | | 713/2 |
| 2009/0065578 A1 | | 3/2009 | Peterson et al. |
| 2009/0204410 A1 | | 8/2009 | Mozer et al. |
| 2009/0259349 A1 | | 10/2009 | Golenski |
| 2009/0315740 A1 | | 12/2009 | Hildreth et al. |
| 2010/0079508 A1 | | 4/2010 | Hodge et al. |
| 2010/0171720 A1 | | 7/2010 | Craig et al. |
| 2010/0207877 A1* | | 8/2010 | Woodard ................ G06F 3/013 |
| | | | 345/156 |
| 2010/0211918 A1 | | 8/2010 | Liang et al. |
| 2010/0235646 A1* | | 9/2010 | Fu ........................ G06F 21/575 |
| | | | 713/186 |
| 2011/0065451 A1 | | 3/2011 | Danado et al. |
| 2011/0213253 A1* | | 9/2011 | Kruglick .............. A61B 5/0064 |
| | | | 600/477 |
| 2012/0086806 A1* | | 4/2012 | Hiramine .............. G06F 21/316 |
| | | | 348/143 |
| 2012/0099261 A1* | | 4/2012 | Reber .................... G06F 1/1632 |
| | | | 361/679.3 |
| 2012/0110514 A1* | | 5/2012 | Trowbridge .......... G06F 9/5077 |
| | | | 715/853 |
| 2012/0149309 A1 | | 6/2012 | Hubner et al. |
| 2012/0220311 A1 | | 8/2012 | Rodriguez et al. |
| 2012/0268268 A1 | | 10/2012 | Bargero |
| 2012/0293643 A1* | | 11/2012 | Hanna ................ H04N 5/23212 |
| | | | 348/78 |
| 2013/0021459 A1 | | 1/2013 | Vasilieff et al. |
| 2013/0044042 A1 | | 2/2013 | Olsson et al. |
| 2013/0170755 A1 | | 7/2013 | Dalton et al. |
| 2013/0246663 A1 | | 9/2013 | Raveendran et al. |
| 2013/0246800 A1* | | 9/2013 | Stewart .................... G06F 21/32 |
| | | | 713/176 |
| 2013/0307771 A1 | | 11/2013 | Parker et al. |
| 2014/0215201 A1* | | 7/2014 | Pfeifer .................... G06F 9/441 |
| | | | 713/100 |
| 2014/0289834 A1* | | 9/2014 | Lindemann ............ G06Q 20/42 |
| | | | 726/7 |
| 2014/0317524 A1 | | 10/2014 | VanBlon et al. |
| 2015/0199006 A1* | | 7/2015 | He ........................ G06F 3/013 |
| | | | 345/158 |
| 2016/0080207 A1* | | 3/2016 | Prakash .................. H04L 47/18 |
| | | | 370/231 |
| 2016/0085565 A1* | | 3/2016 | Arcese .................... G06F 9/4451 |
| | | | 726/7 |
| 2016/0162255 A1* | | 6/2016 | Nishimura .............. G06F 3/165 |
| | | | 381/303 |

FOREIGN PATENT DOCUMENTS

| | | |
|---|---|---|
| EP | 0880090 | 11/1998 |
| WO | 2004051392 | 6/2004 |

OTHER PUBLICATIONS

S. Mayhew, "TI releases DSP Software and SDK from for Real Time Biometric Analytics", May 30, 2012, retrieved online from: https://www.biometricupdate.com/201205/ti-releases-dsp-software-and-sdk-from-for-real-time-biometric-analytics.*

BIOS as found in the archived version (dated Mar. 19, 2015) of Wikipedia using the internet archive Wayback Machine. The article was retrieved via https://web.archive.org/web/20150319064507/https://en.wikipedia.org/wiki/BIOS.*

R. Dowell, "Pre-boot biometric authentication using fingerprints", International 1C—Taipei, Conference Proceedings, May 3, 2000 (Year: 2000).*

S. Mayhew, "TI releases DSP Software and SDK from for Real Time Biometric Analytics", May 30, 2012, retrieved online from: https://www.biometricupdate.com/201205/ti-releases-dsp-software-and-sdk-from-for-real-time-biometric-analytics (Year: 2012).*

Russell Speight Vanblon, Neal Robert Caliendo Jr.; "Automatic Magnification and Selection Confirmation" file history of related U.S. Appl. No. 14/322,119, filed Jul. 2, 2014.

Russell Speight Vanblon, Neal Robert Caliendo Jr.; "Magnification Based on Eye Input" file history of related U.S. Appl. No. 14/546,962, filed Nov. 18, 2014.

Russell Speight Vanblon, Suzanne Marion Beaumont, Rod David Waltermann, "Detecting Pause in Audible Input to Device" file history of related U.S. Appl. No. 14/095,369, filed Dec. 3, 2013.

Suzanne Marion Beaumont, Russell Speight Vanblon, Rod D. Waltermann, "Devices and Methods to Receive Input at a First Device and Present Output in Response on a Second Device Different from the First Device" file history of related U.S. Appl. No. 14/095,093, filed Dec. 3, 2013.

Jonathan Gaither Knox, Rod D. Waltermann, Liang Chen, Mark Evan Cohen, " Initiating Personal Assistant Application Based on Eye Tracking and Gestures" file history of related U.S. Appl. No. 14/095,235, filed Dec. 3, 2013.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking" file history of related U.S. Appl. No. 14/132,663, filed Dec. 18, 2013.

Russell Speight Vanblon, Rod David Waltermann, John Carl Mese, Arnold S. Weksler, Nathan J. Peterson, "Detecting Noise or Object Interruption in Audio Video Viewing and Altering Presentation Based Thereon" file history of related U.S. Appl. No. 14/158,990, filed Jan. 20, 2014.

Russell Speight Vanblon, Axel Ramirez Flores, Jennifer Greenwood Zawacki, Alan Ladd Painter, "Skin Mounted Input Device" file history of related U.S. Appl. No. 14/162,115, filed Jan. 23, 2014.

Axel Ramirez Flores, Rod David Waltermann, James Anthony Hunt, Bruce Douglas Gress, James Alan Lacroix, "Glasses with Fluid-Fillable Membrane for Adjusting Focal Length of One or More Lenses of the Glasses" file history of related U.S. Appl. No. 14/453,024, filed Aug. 6, 2014.

Steven Richard Perrin, Jianbang Zhang, John Weldon, Scott Edwards Kelso, "Initiating Application and Performing Function Based on Input" file history of related U.S. Appl. No. 14/557,628, filed Dec. 2, 2014.

Rod David Waltermann, John Carl Mese, Nathan J. Peterson, Arnold S. Weksler, Russell Speight Vanblon, "Movement of Displayed Element from One Display to Another" file history of related U.S. Appl. No. 14/550,107, filed Nov. 21, 2014.

Amy Leigh Rose, Nathan J. Peterson, John Scott Crowe, Bryan Loyd Young, Jennifer Lee-Baron, "Presentation of Data on an at Least Partially Transparent Display Based on User Focus" file history of U.S. Appl. No. 14/548,938, filed Nov. 20, 2014.

Rod David Waltermann, Russell Speight Vanblon, Nathan J. Peterson, Arnold S. Weksler, John Carl Mese, "Authentication Based on Body Movement" file history of related U.S. Appl. No. 14/643,132, filed Mar. 10, 2015.

Grigori Zaitsev, Russell Speight Vanblon, "Projection of Images on Side Window of Vehicle" filed history of related U.S. Appl. No. 14/639,263, filed Mar. 5, 2015.

(56) References Cited

OTHER PUBLICATIONS

Scott Wentao Li, Russell Speight Vanblon, Liang Chen, "Presentation of Audio Based on Source" file history of related U.S. Appl. No. 14/661,143, filed Mar. 18, 2015.
Amy Leigh Rose, Nathan J. Peterson, John Scott Crowe, Bryan Loyd Young, "Prevention of Light from Exterior to a Device Having a Camera from Being Used to Generate an Image Using the Camera Based on the Distance of a User to the Device" file history of related U.S. Appl. No. 14/659,803, filed Mar. 17, 2015.
Russell Speight Vanblon, Jianbang Zhang, John Weldon Nicholson, "Execution of Function Based on Location of Display at Which a User is Looking and Manipulation of an Input Device" file history of related U.S. Appl. No. 14/643,505, filed Mar. 10, 2015.
Vibewrite Lernstift 'Jules Verne Edition', website printout Jan. 20, 2015, http://vibewrite.com/shop/index.php?route=product/product&path=59&product_id=52.
Wikipedia, "Extended Display Identification Data", Definition; http://en.wikipedia.org/wiki/Extended_display_Identification_data, printed from website Oct. 10, 2014.
Extron, "Digital Connection, Understanding EDID—Extended Display Identification Data", Fall 2009, www.extron.com.
"Relationship Between Inches, Picas, Points, Pitch, and Twips", Article ID: 76388; http://support2.microsoft.com/KB/76388. Printed Oct. 10, 2014.
Wikipedia, "Polarizer" Definition; http://en.wikipedia.org/wiki/Polarizer, printed from website Jan. 14, 2015.
Wikepedia, "Smart Glass" Definition, http://en.wikipedia.org/wiki/Smart_glass, printed from website Jan. 14, 2015.
Wikipedia, "Microphone array", definition, http://en.wikipedia.org/wiki/Microphone_array, printed from website Jan. 22, 2015.
Wikipedia, "Beamforning", definition; http://en.wikipedia.org/wiki/Beamforming, printed from website Jan. 22, 2015.
"Understanding & Using Directional Microphones", http://www.soundonsound.com/sos/sep00/articles/direction.htm; Published in SOS Sep. 2000.
Wikipedia, "Microphone", definition; http://en.wilipedia.org/wkik/microphone, printed from website Jan. 22, 2015.
Thalmiclabs, "Myo-Tech Specs", http://www.thalmic.com/en/myo/techspecs, printed from website Jan. 27, 2015.
Thalmiclabs, "Myo Gesture Control Armband" http://www.thalmic.com/en/myo, printed from website Jan. 27, 2015.
Wikipedia, "Electromyography", definition; http://en.wikipedia.org/wiki/Electromyogrpahy, printed from website Jan. 27, 2015.
Isource: "Raise to Speak Makes Sid Wonderfully Useful (Once You Know How to Use It)", http:///isource.com/10/01/raise-to-speak-makes-sid-wonderfully-useful-once-you-know-how-to-use-it./ Web printout Nov. 15, 2013.
Tactus Technology, "Taking Touch Screen Interfaces Into a New Dimension", 2012 (13 pages).
Arthur Davis, Frank Kuhnlenz, "Optical Design Using Fresnel Lenses, Basic Principles and some Practical Examples" Optik & Photonik, Dec. 2007.
Superfocus, "See the World in Superfocus Revolutionary Eyeglasses Give You the Power to Focus Your Entire View at Any Distance", http://superfocus.com/eye-care-practitioners, printed from website Jun. 24, 2014.
Darren Quick, "PixelOptics to Launch 'world's first electronic focusing eyewear", http://www.gizmag.com/pixeloptics-empower-electroni-focusing-glasses/17569/. Jan. 12, 2011.
Insight News, "Electronic-lens company PixelOptics is bankrupt", htttp://www.insightnews.com.au/_blog/NEWS_NOW!/post/lens/electronic-lens-company-pixeloptics-is-bankrupt/. Dec. 12, 2013.
Livescribe:: Never Miss a Word. Website printout Jan. 20, 2015, http://www.livescribe.com/en-us/.
Livescribe:: Never Miss a Word, What is a Pencast? Website printout Jan. 20, 2015, http://www.livescribe.com/en-us-pencasts/.

* cited by examiner

CAMERA THAT USES LIGHT FROM PLURAL LIGHT SOURCES DISPOSED ON A DEVICE

FIELD

The present application relates generally to cameras that use light from plural light sources disposed on a device.

BACKGROUND

As recognized herein, devices are often provided with a camera that has limited functionality. This limited functionality often prevents such a camera from being used for multiple purposes, which is undesirable for the increasingly complex devices that are coming to market.

SUMMARY

Accordingly, in one aspect a device includes a processor, a first light source accessible to the processor, a second light source different from the first light source that is accessible to the processor, a camera accessible to the processor, and storage accessible to the processor. The storage bears instructions executable by the processor to actuate the first light source to execute a first function using the camera and actuate the second light source to execute a second function different from the first function using the camera.

In another aspect, a method includes controlling a first light source disposed on a device at a first location to generate light, generating at least a first image at a camera disposed on the device based at least in part on at least some of the light from the first light source, and executing iris recognition at least in part using the at least first image. The method also includes controlling a second light source disposed on the device at a second location different from the first location to generate light, generating at least a second image at the camera based on at least some of the light from the second light source, and executing eye tracking on the at least second image.

In still another aspect, a device includes a processor and a camera module accessible to the processor. The camera module includes an imager, a first light source spaced a first distance away from the imager, and a second light source spaced a second distance away from the imager. The second distance is greater than the first distance.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g., smart TVs. Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B. C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
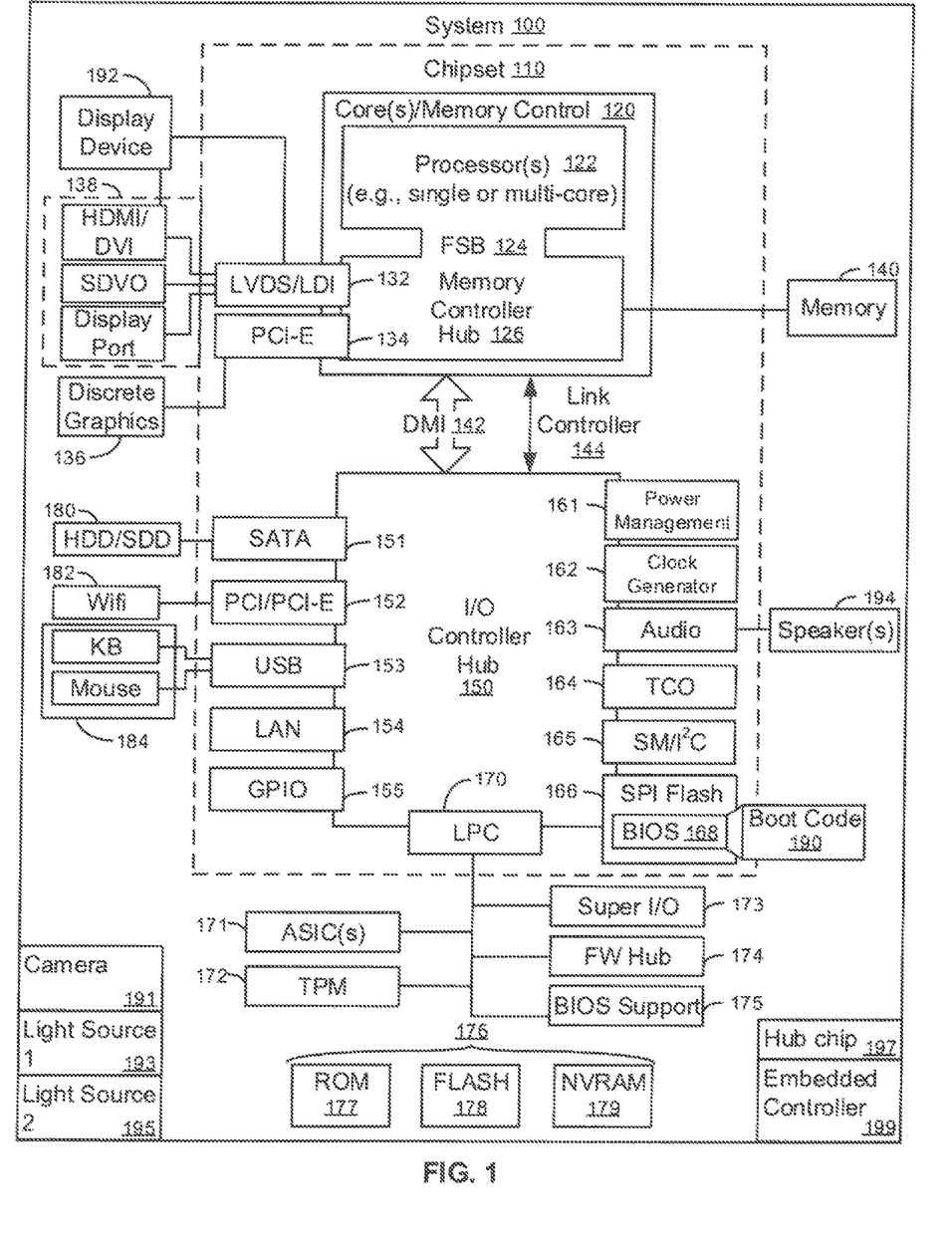
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video. HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still in reference to FIG. 1, a camera 191 is shown which is configured for gathering one or more images in accordance with present principles and providing input related thereto to the processor 122. The camera 191 is understood to be able to sense infrared (IR) light and to generate images at least based on the IR light. Notwithstanding, the camera 191 may also be a thermal imaging camera, a digital camera such as a webcam, a three-dimensional (3D) camera, etc. The system 100 also includes a first light source 193 and a second light source 195. The light sources 193 and 195 may be IR light emitting diodes (LEDs) in some embodiments, or still other types of IR light emitters in other embodiments.

In addition to the foregoing, the system 100 may also comprise a chip 197 made of a material such as silicon and having stored thereon one or more different types of images and/or templates associated with a particular user for secure authentication of the user outside of a guest operating system (GOS) executed by the system 100, such as Windows, Linux, or Max OSX. In some embodiments, the chip 197 may be a hub storing plural types authentication templates, such as reference templates to perform fingerprint matching and iris matching, and hence authentication, using fingerprint and iris input from the user when the user seeks access to the system 100.

Still further, the system 100 includes an embedded controller 199, which will be described in more detail below. Additionally, though now shown for clarity, in some embodiments the system 100 may include a gyroscope for sensing and/or measuring the orientation of the system 100 and providing input related thereto to the processor 122, an accelerometer for sensing acceleration and/or movement of the system 100 and providing input related thereto to the processor 122, and an audio receiver/microphone providing input to the processor 122 based on, e.g., a user providing audible input to the microphone. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

Figure 2:
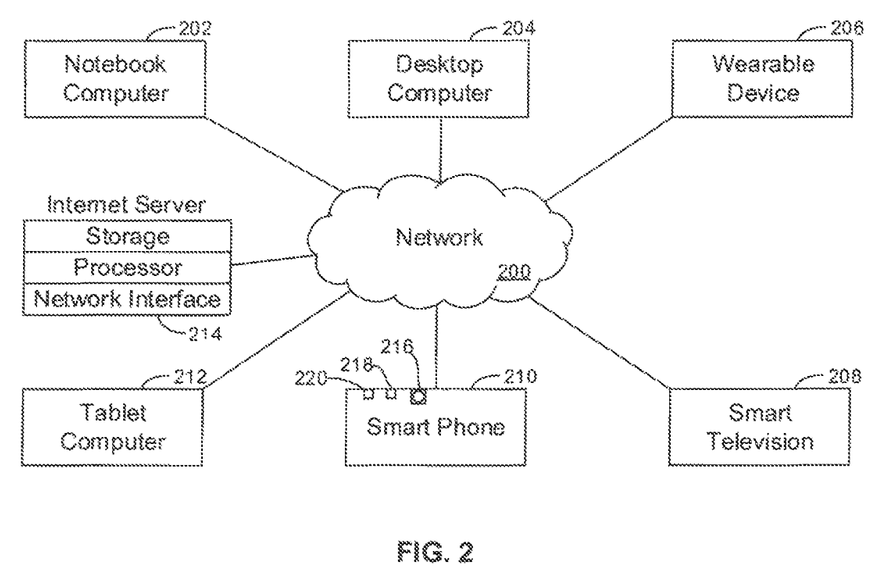
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as the Internet in accordance with present principles. It is to be understood that each of the devices described in reference to FIG. 2 may include at least some of the features, components, and/or elements of the system 100 described above. In any case, FIG. 2 shows a notebook computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

It is to also be understood in reference to FIG. 2 that the block diagram of the smart phone 210 as shown therein is from a front perspective of the phone 210 when held upright, with the front of the phone 210 bearing a touch-enabled display. Furthermore, the phone 210 may include a camera 216 centrally disposed at a top portion of the phone 210 (e.g., at or near the top edge) relative to the upright orientation of the phone 210 shown. The phone 210 also includes a first light source 218 and a second light source 220. The camera 216 and light sources 218, 220 may be used in accordance with present principles as set for further below.

Figure 3:
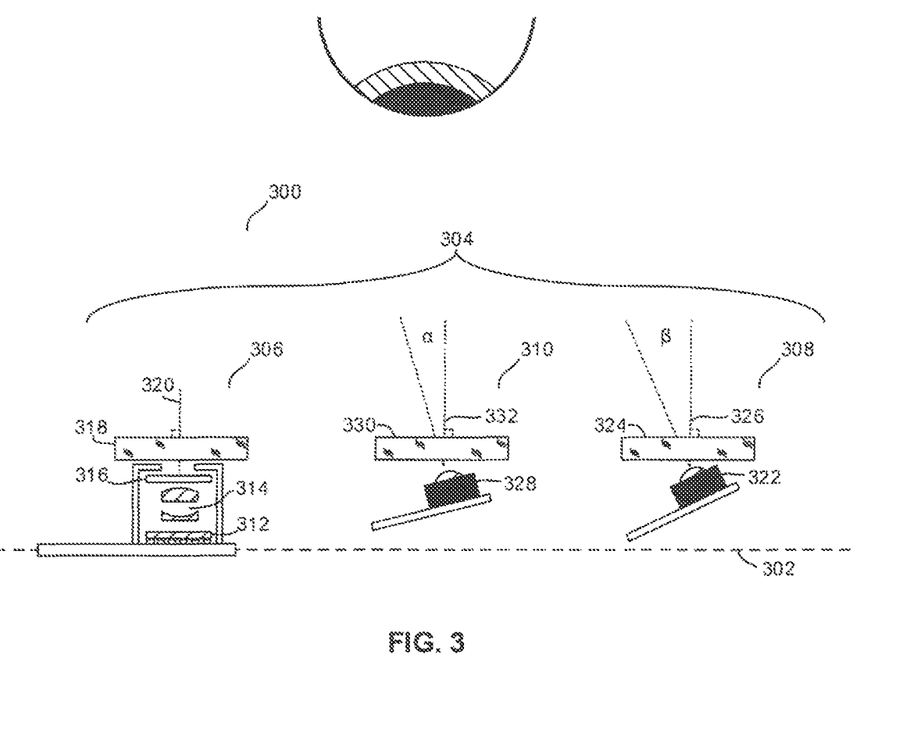
FIG. 3 is a block diagram of an example camera module accompanied by plural light sources in accordance with present principles.

Before describing FIG. 3, it is to be understood that when executing eye tracking, it is desirable for a device such as the system 100 to actuate a light source thereon at a particular angle relative to its camera to create a red eye effect because this red eye effect is useful for performing eye tracking such as by tracking the movement of the user's eyes based on movement of the red eye effect as shown in plural images of the user's eyes taken relatively close in time to each other. Accordingly, it is desirable to juxtapose a light source to be used for eye tracking relatively close to the camera (such as substantially "on axis" with the camera) to create the red eye effect at the camera based on the path of light from the light source, reflected off the user's eye, and then to the camera.

Notwithstanding, it is to also be understood in accordance with present principles that for performing iris recognition, such a red eye effect is undesirable and can impede the ability of the camera to gather a detailed and accurate image of the user's iris for iris identification. Thus, it is also recognized herein that it is desirable to juxtapose a light source to be used for iris recognition father away from the camera than a light source for eye tracking to thus minimize or eliminate the potential for red eye effect at the camera based on the path of light from the farther away light source, reflected off the user's eye, and then to the camera.

Now referring to FIG. 3, it shows an example embodiment of a device 300 in accordance with present principles, with portions of the device 300 cut away for clarity. It is to be understood that the device 300 may include at least some of the components described above in reference to the system 100. In any case, the device 300 includes a housing 302 bearing thereon a camera module 304. The camera module 304 comprises a camera 306, a first light source 308 and a second light source 310. Note that the camera 306, first light source 308, and second light source 310 all face outward away from the housing 302. Also note that the second light source 310 is spaced (e.g., at least laterally on the housing) a distance away from the camera 306 that is closer than a distance away that the first light source 308 is spaced from the camera 306. As a point of reference and in some embodiments, the positioning of the camera 306 on the device 300 may correspond to the positioning of the camera 216 on the phone 210 described above. Furthermore, the positioning of the light source 308 may correspond to the positioning of the light source 220 on the phone 210, while the positioning of the light source 310 may correspond to the positioning of the light source 218 on the phone 210.

Describing the camera 306 is more detail, it may include an imager 312 for gathering images based on light that is sensed thereat, such as IR light, in accordance with present principles. The camera 306 also includes at least one lens 314, and at least one IR bandpass filter 316. The filter 316 may be configured to permit light in the IR band to pass therethrough from exterior to the device 300 to the imager 312 while disallowing light in at least one other band from passing therethrough. Furthermore, note that the camera 306 may include glass 318 (which may be made integral with the housing 302) through which light may pass and which may protect the other portions of the camera 306.

Also, note that an axis 320 is established along a direction of the camera 306 that faces outwardly away from the device 300 to gather at least one image based on light from outside the device 300. The axis 320 may also be perpendicular to a plane established by the outward-facing surface of the glass 318 and/or IR bandpass filter 316.

Still in reference to FIG. 3 and describing the first light source 308 in more detail, it may include at least one IR light emitting diode (LED) 322 that emits light therefrom and through glass 324, where the glass may protect the light source 308 (and may be made integral with the housing 302). As may be appreciated from FIG. 3, the LED 322 is disposed on the housing 302 at an angle beta relative to an axis 326 perpendicular to a plane established by the outward-facing surface of the glass 324 and/or a plane established by the surface of the housing 302 bearing the glass 324.

Now describing the second light source 310, it may include at least one IR LED 328 that emits light therefrom and through glass 330, where the glass may protect the light source 310 (and may be made integral with the housing 302). FIG. 3 shows that the LED 328 is disposed on the housing 302 at an angle alpha relative to an axis 332 perpendicular to a plane established by the outward-facing surface of the glass 330 and/or a plane established by the surface of the housing 302 bearing the glass 330. Note that the angle alpha is a smaller angle than the angle beta at which the light source 308 is oriented to emit light.

Accordingly, it may be appreciated that owing to the greater distance between the light source 308 and camera 306 than between the light source 310 and the camera 306, and also due to the larger angle beta than the angle alpha, light from the source 308 may reflect off an eye 334 of a user and to the camera 306 for generation of an image without a red eye effect for performing iris recognition using image that is generated. It may also be appreciated that owing to the relatively smaller distance between the source 310 and camera 306 and lesser angle alpha, light from the source 310 may reflect off the eye 334 and to the camera 306 for generation of an image with a red eye effect for performing eye tracking using the image that is generated.

Figure 4:
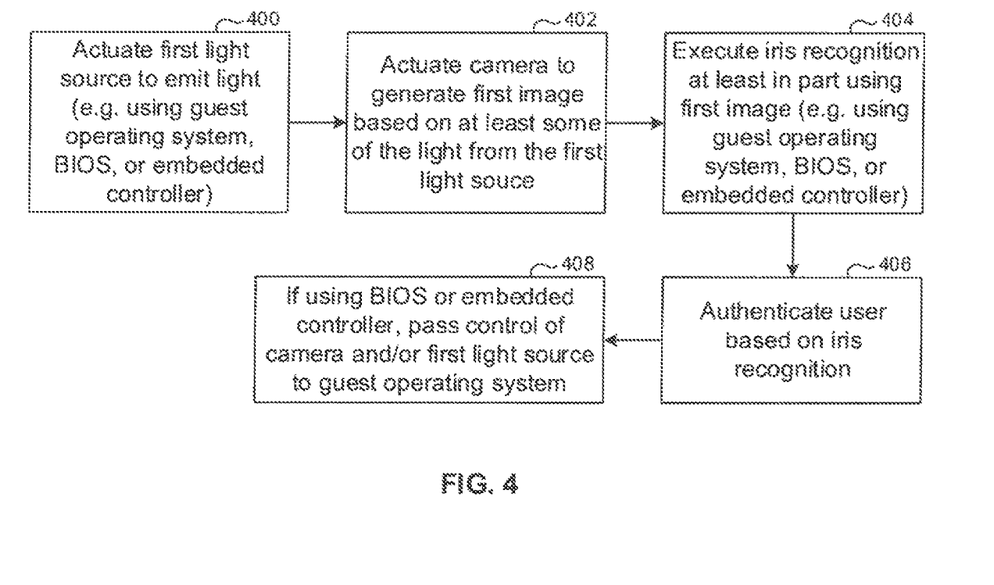
FIGS. 4-6 are flow charts showing example algorithms in accordance with present principles.

Before moving on to the description of FIG. 4, it is to be understood in reference to FIG. 3 that each of the light sources 308 and 310 may in some embodiments include sets of LEDs. It is to be further understood that in some embodiments, more than two light sources may be used and may be disposed at other locations on the device, such as, e.g., on the other side of the camera 306 relative to the perspective shown in FIG. 3 and/or on the same side of the camera 306 as the light sources 308 and 310 are disposed as shown in FIG. 3 (and optionally, disposed along the same line established by the light sources 308 and 310). Moreover, in some embodiments there may be banks of light sources on each side of the camera 306 for use at different distances, angles, and/or fields of view of the user relative to the camera 306.

Referring now to FIG. 4, it shows example logic that may be undertaken by a device such as the system 100 in accordance with present principles (referred to below as the "present device"). Beginning at block 400, the logic actuates a first light source (such as the light source 308 described above) to emit light. The logic may do so at block 400, e.g., responsive to a command from a user to power on the present device, responsive to a command from the user to authenticate the user for access to the present device, etc. The logic may also do so at block 400 using a guest operating system (GOS) such as Windows, Linux, or Max OSX, using a basic input/output system (BIOS), or using an embedded controller. It may be appreciated in accordance with present principles that using BIOS or an embedded controller may provide a secure path for authentication that is relatively less susceptible to being compromised by hacking and/or otherwise unauthorized manipulation.

In any case, from block 400 the logic moves to block 402. At block 402 the logic actuates the camera to generate at least a first image at least in part using some of the light from the first light source such as may be reflected off a user's eye. The logic then proceeds to block 404, where the logic executes iris recognition at least in part using the first image by, e.g., comparing the characteristics of the user's iris as shown in the first image to the characteristics of an iris shown in a reference image stored on the present device (e.g., on a pixel by pixel basis). Thereafter the logic proceeds to block 406 where, assuming the user's iris was recognized (e.g., based on a match of at least some iris characteristics to the reference image), the logic authenticates the user as being permitted to perform an operation at the present device.

In some embodiments, the logic may conclude at block 406. However, in other embodiments such as where BIOS or an embedded controller is executing the present logic, the logic may optionally move to block 408 where the logic passes control of camera and/or of the first light source to a GOS starting up and/or executing on the present device so that the camera may be controlled by the GOS (and/or specific applications controlled by the GOS) for other purposes and/or for additional authentication.

Figure 5:
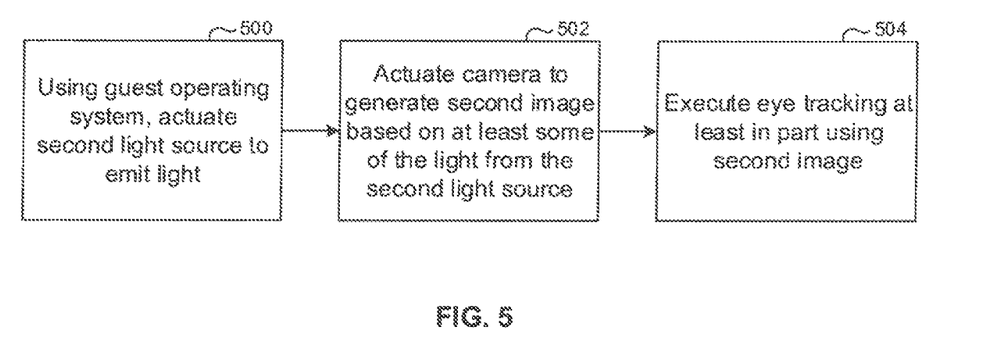

Accordingly, the logic of FIG. 5 may be executed by a GOS on the present device once control of the camera and/or light source is passed thereto, and/or after block 406 of FIG. 4. The logic FIG. 5 begins at block 500, where the logic actuates a second light source such as the light source 310 described above. The logic may do so at block 500 responsive to, e.g., a command to execute eye tracking received at the present device from a user, a command to execute eye tracking received from an application ran by the GOS which is seeking to use eye tracking, etc. Thus, note that an "eye tracking application" as described herein need not necessarily be an application dedicated only to eye tracking, but may be an application that uses eye tracking to perform other functions such as receiving user commands based on eye tracking, controlling movement of a cursor presented on a display of the present device to correspond to movement of the user's eyes across the display, using eye tracking as input for the user to play a game executing on the present device, determining information of interest to the user based on the user looking at a particular area of the display at which the information is presented, etc.

Regardless, and still in reference to FIG. 5, from block 500 the logic moves to block 502 where the logic actuates a camera on the present device to generate at least one second image, and in some embodiment plural images, based on at least in part using some of the light from the second light source such as may be reflected off a user's eye. The logic then proceeds to block 504, where the logic executes eye tracking at least in part using the at least second image, such as at least in part by, e.g., tracking movement of the user's pupils as recognized based on movement of a red eye effect as shown in plural images generated at block 502.

Continuing the detailed description in reference to FIG. 6, it shows example logic that may be undertaken by a device such as the system 100 in accordance with present principles (referred to below as the "present device") for authenticating a user based on iris recognition using a "match on chip" process as disclosed herein. The logic of FIG. 6 may be executed by BIOS or an embedded controller and hence use a relatively secure path for authentication.

Beginning at block 600, the logic receives a first image generated by a camera, such as the first image described above in reference to FIG. 4. The logic then moves to block 602, where the logic accesses a chip with at least one reference image and/or template stored thereon. The chip may be made of a material such as silicon. In some embodiments, the chip may be a "hub" storing plural types images and/or templates for plural forms of authentication, such as reference templates to perform fingerprint matching, facial feature matching, voice matching, and iris matching, and hence authentication, respectively using fingerprints, facial features, a voice, and/or an iris of a user. The chip may also store information on gaze/eye tracking for authentication, such as may be the case where the user is to look at particular areas of the device (and in some embodiments, specifically the display) in a particular sequence.

Figure 6:
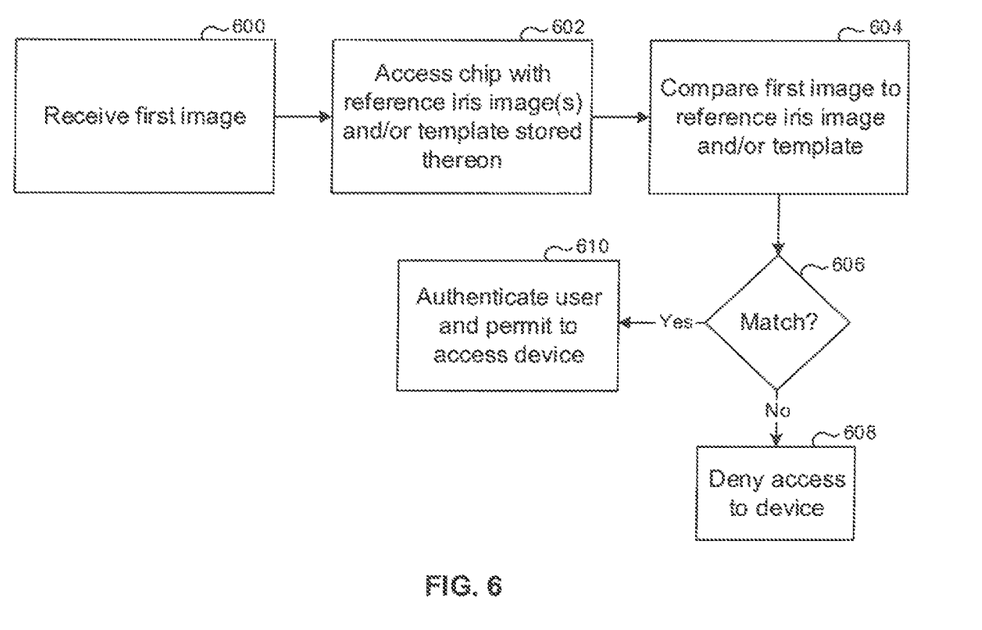

In any case, the logic of FIG. 6 moves from block 602 to block 604, where the logic compares the first image to at least one reference iris image and/or template to identify similarities and hence identify the user's iris as matching the iris image stored on the chip. Thus, at decision diamond 606 the logic determines whether a match exists. Responsive to a negative determination at diamond 606, the logic moves to block 608 and denies access to the present device. However, responsive to an affirmative determination at diamond 606, the logic moves to block 610 where the logic authenticates the user based on the match and then permits access to the device.

Figure 7:
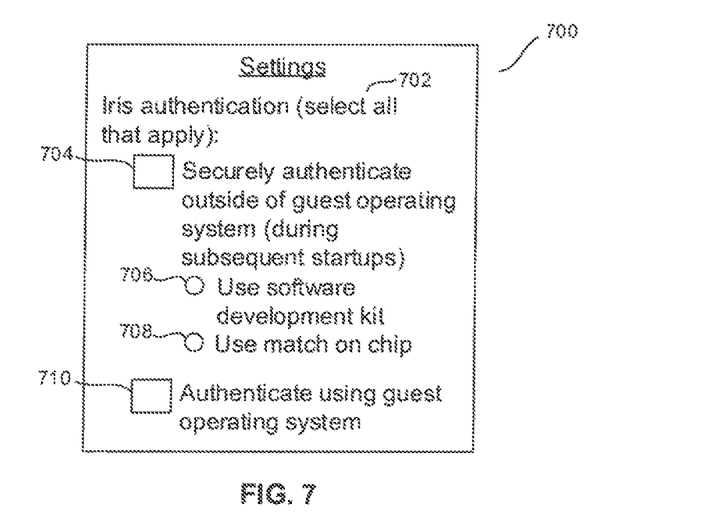
FIG. 7 is an example user interface (UI) in accordance with present principles.

Before moving on to the description of FIG. 7, it is to be understood in reference to the match on chip embodiment(s) disclosed herein that the reference images and/or templates may be "locked away" on this chip (and/or a host controller) such as for authentication (and also optionally, key exchange) at power on of the device. It is to also be understood that an application specific integrated circuit (ASIC) (e.g., on the chip) and/or an embedded controller which uses an encoded and/or dedicated link between the chip and the camera may be used (or if performing, e.g., fingerprint recognition, a finger print reader) to create a relatively secure path for authentication, although it is to also be understood that BIOS may access the chip to perform authentication. Furthermore, it is to be understood that the "back end" of the chip may connect to a system on a chip (SoC) and/or a CPU (e.g. the main processor of the present device) to pass control thereto upon successful authentication so that the CPU may boot the GOS and/or otherwise permit access to the present device.

Still further, in some embodiments the controller of the hub chip may mange which method(s) of authentication to use depending on an orientation of the device and/or other physical device configurations. Thus, if the device were a Lenovo Yoga convertible computer that has multiple configurations and/or modes of folding a panel bearing a display relative to a panel bearing a keyboard (e.g. tablet mode, tent mode, and clam shell mode), different authentication methods using the chip may be used. For example, in a tent mode, iris authentication may be used, in a clam shell mode, fingerprint authentication may be used, and in a tent mode, voice authentication may be used. Selection of which method to use during which physical device configuration may be made by a user e.g. using a UI presented on the display of the device.

Describing establishment of the reference data and/or templates on the chip, it is to be understood that a user may be prompted to create the reference data and/or templates, and/or provide the corresponding input (e.g. voice input, fingerprint input, iris input), when he or she starts the device for the first time and/or otherwise registers or enrolls himself or herself with the device. As but one example, a user may establish a fingerprint template by pressing their finger against a fingerprint sensor several times to create an adequate template for the fingerprint. In any case, that data is then saved to the chip (e.g., imprinted thereon) as the reference data and/or template. Also, it is to be understood that the chip itself may have encryption and/or other security protocols for security.

Now in reference to FIG. 7, it shows an example user interface (UI) presentable on a device such as the system 100 in accordance with present principles. The UI 700 includes at least a first setting 702 to configure how iris authentication is executed. Thus, a first check box 704 is presented that is selectable by a user to enable "secure" authentication at subsequent start ups of the device that does not involve use of a GOS. Also note that beneath the check box 704 for this secure authentication option is a radio button 706 selectable by a user to enable use of a software development kid (SDK) for the "secure" authentication, as well as a radio button 708 selectable by a user to enable use of a match on chip authentication for the "secure" authentication. SDKs for use in accordance with present principles will be described further below. In any case, note that a second check box 710 is also presented on the UI 700 that is selectable, in addition to or in lieu of selection of the box 704, to enable iris authentication using a GOS and/or an application managed by the GOS for performing iris authentication (e.g., such as after an initial iris authentication using match on chip in response to a power on command).

Now describing SDKs in more detail, it is to be understood that SDKs and/or other software (e.g., an application programming interface (API)) developed to interface with an image signal processing (ISP) chip associated with a camera module, and/or to interface with the camera module another way, may be used by BIOS and/or a GOS in accordance with present principles, such as to perform iris identification and authentication. After iris authentication, the SDK may then be used to switch to activation of another diode than the one used for iris authentication to continue executing functions in accordance with present principles, such as to perform eye tracking. Even further, it is to be understood that the SDK may also be used to then switch back to iris authentication (e.g. during the same startup and/or login session for the device) to securely perform another iris authentication using a secure input/output camera path, an encrypted part of a processor, and/or match on chip, if desired.

It may now be appreciated that present principles provide for systems and methods of having one camera module with two IR diode sources of illumination to support multilayered functionality using the camera. Furthermore, in some embodiments the camera module may be used via a secure path for authentication, and then the path may be switched to another camera I/O interface to the CPU for eye-tracking application use.

As those skilled in the art can appreciate, a BIOS may be a set of routines stored in read-only memory that enable a computer to start an operating system and to communicate with the various devices in a system, such as disk drives, keyboard, monitor, printer, and communications ports. In one embodiment, functions performed by BIOS may also be performed by other higher-level software application programs. In another embodiment, BIOS may be a Unified Extensible Firmware Interface (UEFI), which assists in control handoff of a computer system to an operating system during a pre-boot environment (e.g., after the computer system is powered on, but before the operating system starts).

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular CAMERA THAT USES LIGHT FROM PLURAL LIGHT SOURCES DISPOSED ON A DEVICE is herein shown and described in detail, it is to be understood that the subject matter which is encompassed by the present application is limited only by the claims.

What is claimed is:

1. A device, comprising:
    at least one processor;
    a first light source accessible to the at least one processor;
    a second light source different from the first light source, wherein the second light source is accessible to the at least one processor;
    a camera accessible to the at least one processor; and
    storage accessible to the at least one processor, the storage bearing instructions executable by the at least one processor to:
    actuate the first light source to execute a first function using the camera; and
    actuate the second light source to execute a second function different from the first function using the camera, wherein the first function is iris recognition and wherein the second function is eye tracking;
    wherein the first function is executed based on the device being in a first physical configuration established by a first orientation of a first portion of the device with respect to a second portion of the device, wherein a third function is executed based on the device being in a second physical configuration established by a second orientation of the first portion of the device with respect to the second portion of the device, wherein the third function is different from the first function, wherein the third function is related to authentication, and wherein the first orientation is different from the second orientation; and
    wherein the instructions are further executable by the at least one processor to:
    present a user interface (UI) on a display, wherein the first function and the third function are respectively selectable from the UI to respectively enable at least one setting for the device to, responsive to enablement of the at least one setting, execute the first function based on the device being in the first physical configuration and to execute the third function based on the device being in the second physical configuration.

2. The device of claim 1, wherein the iris recognition is executed at least in part using an embedded controller but not using a guest operating system (GOS), and wherein the eye tracking is executed using a GOS.

3. The device of claim 1, comprising a guest operating system (GOS), wherein the storage stores an eye tracking application executable by the GOS to execute the eye tracking based at least in part on data from the camera generated at least in part based on receipt of light that originated from the second light source and reflected off at least a portion of a person's eye.

4. The device of claim 1, wherein the first light source and the second light source each respectively comprise at least one light emitting diode (LED).

5. A method, comprising:
    controlling a first light source to generate light, the first light source being disposed on a device at a first location;
    generating, at a camera disposed on the device, at least a first image based on at least some of the light from the first light source;
    executing iris recognition at least in part using the at least first image;
    controlling a second light source to generate light, the second light source being disposed on the device at a second location different from the first location;
    generating, at the camera, at least a second image based on at least some of the light from the second light source; and
    executing eye tracking at least in part using the at least second image;
    wherein the iris recognition at least in part establishes a first function, wherein the eye tracking at least in part establishes a second function, wherein the first function is executed based on the device being in a first physical configuration established by a first orientation of a first portion of the device with respect to a second portion of the device, wherein a third function is executed based on the device being in a second physical configuration established by a second orientation of the first portion of the device with respect to the second portion of the device, wherein the third function is different from the first function, wherein the third function is related to authentication, and wherein the first orientation is different from the second orientation; and
    wherein the method comprises:
    presenting a user interface (UI) on a display, wherein the first function and the third function are respectively selectable from the UI to respectively enable at least one setting for the device to, responsive to enablement of the at least one setting, execute the first function based on the device being in the first physical configuration and to execute the third function based on the device being in the second physical configuration.

6. A device, comprising:
    at least one processor; and
    a camera module accessible to the at least one processor, the camera module comprising:
    an imager;
    a first light source spaced a first distance away from the imager, wherein the imager generates first images of reflections from the first light source, and wherein the at least one processor executes eye tracking based on the first images; and
    a second light source spaced a second distance away from the imager, wherein the imager generates second images of reflections from the second light source, wherein the at least one processor executes a first type of authentication based on the second images;
    wherein the first type of authentication at least in part establishes a first function, wherein the eye tracking at least in part establishes a second function, wherein the first function is executed based on the device being in a first physical configuration established by a first orientation of a first portion of the device with respect to a second portion of the device, wherein a third function is executed based on the device being in a second physical configuration established by a second orientation of the first portion of the device with respect to the second portion of the device, wherein a second type of authentication at least in part establishes the third function, wherein the first type of authentication is different from the second type of authentication, and wherein the first orientation is different from the second orientation; and wherein the device comprises storage accessible to the at least one processor, the storage comprising instructions executable by the at least one processor to:

present a user interface (UI) on a display accessible to the at least one processor, wherein the first function and the third function are selectable from the UI to enable at least one setting for the device to, responsive to enablement of the at least one setting, execute the first function based on the device being in the first physical configuration and to execute the third function based on the device being in the second physical configuration.

7. The device of claim 6, wherein an axis is established by an outward-facing direction of the imager, wherein the first light source is oriented to emit light at a first angle relative to the axis, and wherein the second light source is oriented to emit light at a second angle different from the first angle relative to the axis.

8. The device of claim 6, wherein the first light source and the second light source both respectively comprise at least one light emitting diode (LED).

9. The device of claim 1, wherein the third function comprises fingerprint authentication.

10. The device of claim 1, wherein the third function comprises voice authentication.

11. The device of claim 1, wherein the first physical configuration comprises a tent mode.

12. The device of claim 1, wherein the second physical configuration comprises a laptop mode.

13. The device of claim 1, wherein the second physical configuration comprises a tablet mode.

14. The method of claim 5, wherein the third function comprises fingerprint authentication.

15. The method of claim 5, wherein the third function comprises voice authentication.

16. The method of claim 5, wherein the first physical configuration comprises a tent mode.

17. The method of claim 5, wherein the second physical configuration comprises a laptop mode.

18. The method of claim 5, wherein the second physical configuration comprises a tablet mode.

19. The device of claim 6, wherein first type of authentication comprises iris recognition.

20. The device of claim 6, wherein the second type of authentication comprises fingerprint authentication.

21. The device of claim 6, wherein the second type of authentication comprises voice authentication.

22. The device of claim 6, wherein the first physical configuration comprises a tent mode.

23. The device of claim 6, wherein the first physical configuration comprises a laptop mode.

24. The device of claim 6, wherein the first physical configuration comprises a tablet mode.

* * * * *